United States Patent
Teh et al.

(10) Patent No.: US 8,601,198 B2
(45) Date of Patent: Dec. 3, 2013

(54) CONTROLLABLE TRANSACTION SYNCHRONIZATION FOR MERGING PERIPHERAL DEVICES

(75) Inventors: Chee Hak Teh, Bayan Lepas (MY); Chai Huat Gan, Bukit Mertajam (MY); Poh Thiam Teoh, Kuala Lumpur (MY); Mary Siaw See Yeoh, Georgetown (MY); Su Wei Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 13/174,436

(22) Filed: Jun. 30, 2011

(65) Prior Publication Data

US 2013/0007332 A1 Jan. 3, 2013

(51) Int. Cl.
*G06F 13/20* (2006.01)
*G06F 13/38* (2006.01)

(52) U.S. Cl.
CPC .................................. *G06F 13/385* (2013.01)
USPC ......................................................... 710/313

(58) Field of Classification Search
USPC .................. 710/305–317, 104–110, 8–19
See application file for complete search history.

(56) References Cited

U.S. PATENT DOCUMENTS

| 7,917,682 | B2* | 3/2011 | Bakthavathsalam | 710/315 |
| 2008/0195788 | A1* | 8/2008 | Tamir et al. | 710/303 |
| 2008/0320181 | A1* | 12/2008 | Lauterbach et al. | 710/38 |
| 2011/0302329 | A1* | 12/2011 | Azam et al. | 710/14 |
| 2011/0302357 | A1* | 12/2011 | Sullivan | 711/103 |
| 2012/0166701 | A1* | 6/2012 | Oh et al. | 710/315 |
| 2012/0271974 | A1* | 10/2012 | Asnaashari | 710/74 |

* cited by examiner

*Primary Examiner* — Raymond Phan
(74) *Attorney, Agent, or Firm* — Blakely, Sokoloff, Taylor & Zafman LLP

(57) ABSTRACT

Embodiments of the invention describe a host system capable of associating a PCIe device and another separate device to the same device identifier (e.g., device number). A cycle routing module or logic will identify an I/O transaction involving the device identifier, and route the transaction to one or both of the devices (or, in some instances, identify the I/O transaction as a configuration transaction, and simply update the cycle routing module/logic only). In one embodiment of the invention, a root port of the host system is configured to operate as the above described cycle router.

Embodiments of the invention allow for devices to be "merged" into a single device for the host OS. For example, a peripheral devices coupled to the host system via a PCIe link may be "merged" with a peripheral devices coupled to the host system via another PCIe link or a SATA link.

25 Claims, 8 Drawing Sheets

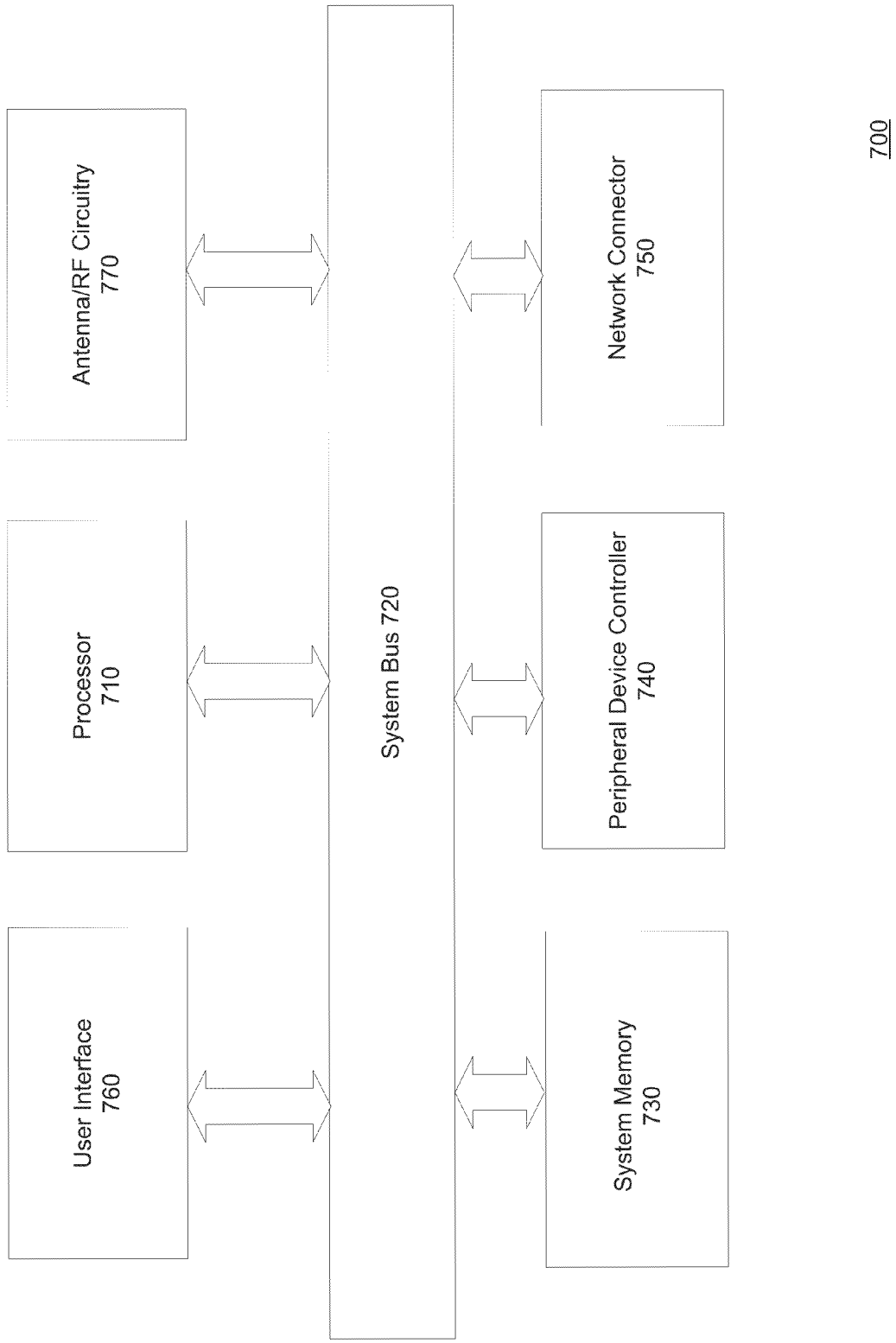

CONTROLLABLE TRANSACTION SYNCHRONIZATION FOR MERGING PERIPHERAL DEVICES

FIELD

Embodiments of the invention generally pertain computing devices and more particularly to system peripheral device control and management.

BACKGROUND

Peripheral Component Interconnect express (PCIe) (as described, for example, in The PCI Express Base Specification of the PCI Special Interest Group, Revision 3.0 published Nov. 18, 2010) describes an interconnection standard for coupling peripheral devices to a host computing system. The host computing system will include a root complex, multiple endpoints (i.e., peripheral devices) and a switch.

The root complex denotes the root of an input/output (I/O) hierarchy that connects the host microprocessor and memory subsystem to the I/O. The root complex will support one or more PCIe ports connected to a single endpoint. The switch will control which point-to-point serial connections between each endpoint and the host system are active, while the root complex manages these connections. Currently, there exists no solution to have a plurality of point-to-point serial connections for a plurality of endpoints managed as a single connection by the root complex. This prevents solutions that merge devices (e.g., cache-use models, Redundant Array of Independent Disk (RAID) memory system models) from utilizing PCIe connections.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 7 is block diagram of a system that may utilize an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe a host system capable of associating a common device identifier (e.g., device number) with a Peripheral Component Interconnect express (PCIe) device and another separate device. The other separate device may be, for example, another PCIe device or a Serial Advanced Technology Attachment (SATA) device (as described, for example, in the Serial ATA Specification, Revision 3.0, published Jun. 29, 2009 by the SATA International Organization).

A cycle routing module or logic will identify an input/output (I/O) transaction involving the device identifier, and route the transaction to one or both of the devices (or, in some instances, identify the I/O transaction as a configuration transaction, and simply update the cycle routing module/logic only). In one embodiment of the invention, a PCIe root port of the host system is configured to operate as the above described cycle router.

As described below, embodiments of the invention allow for devices to be "merged" into a single device for the host operating system (OS). For example, SSD memory devices coupled to the host system via PCIe links may be "merged" with other SSD or HDD memory devices coupled to the host system via SATA links for data caching purposes (e.g., an SSD memory device coupled to the host system via PCIe link may act as a cache for an HDD memory device coupled to the host system via a SATA link), or to form a Redundant Array of Independent Disk (RAID) memory system (as described in embodiments below).

Figure 1:
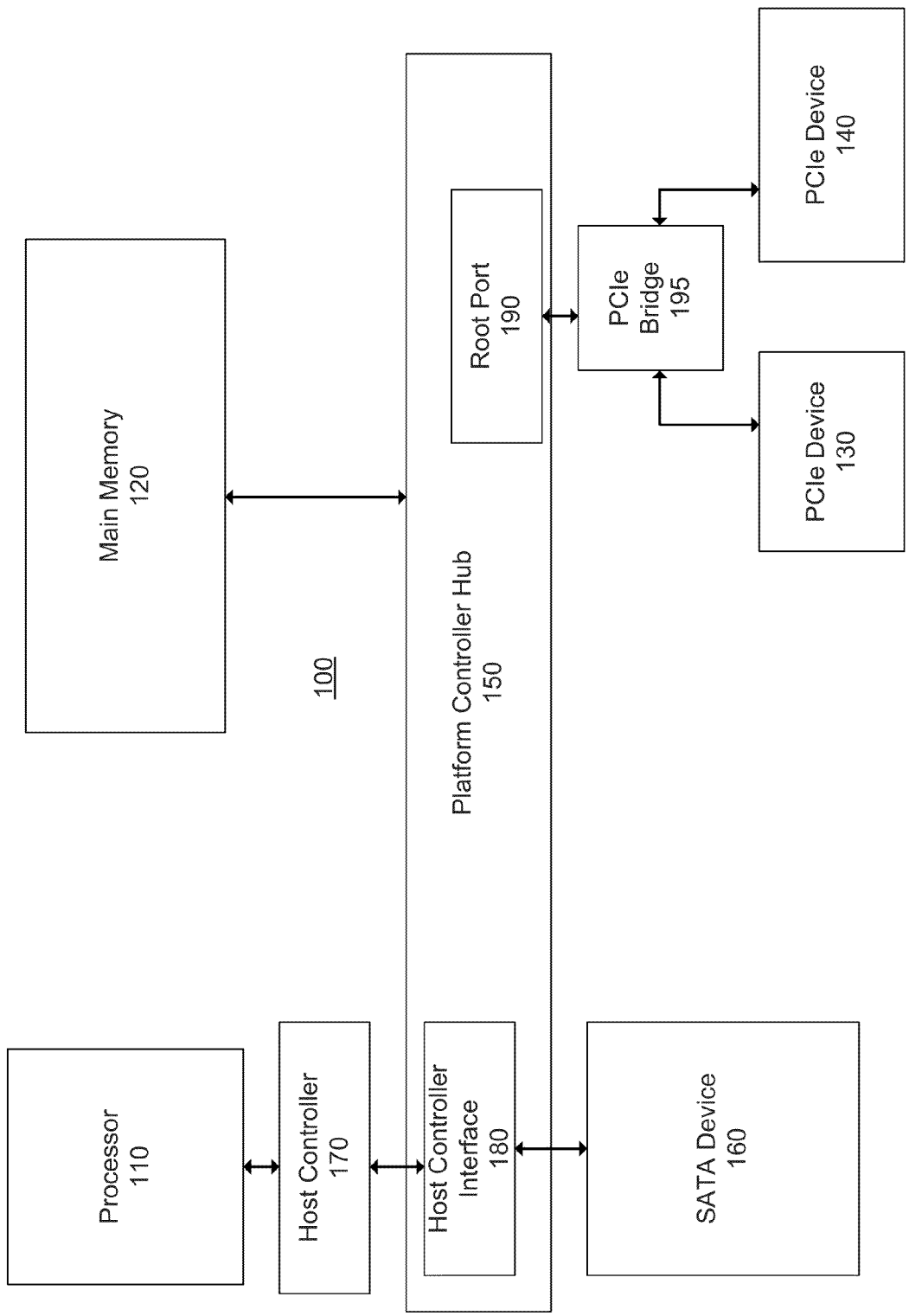
FIG. 1 is a block diagram of host platform hardware that may utilize an embodiment of the invention.

FIG. 1 is a block diagram of host platform hardware that may utilize an embodiment of the invention. In this embodiment, host system 100 includes processor 110, main memory 120, and host controller 170 (which may be alternatively referred to herein as a Host Bus Adaptor (HBA)). Main memory 120 may include any combination of volatile and non-volatile memory, and may include an OS to be executed by processor 110.

Host controller 170 may be any controller capable of exchanging data and/or commands with a storage device in accordance with, for example, any of a Small Computer Systems Interface (SCSI) protocol, a Fibre Channel (FC) protocol, a SCSI over Internet Protocol (iSCSI), a Serial Attached SCSI (SAS) protocol, a Universal Serial Bus (USB) protocol and a SATA protocol.

In accordance with this embodiment, if host controller 170 is to exchange data and/or commands with a memory device in accordance with a SCSI protocol, the SCSI protocol may comply and/or be compatible with the protocol described in American National Standards Institute (ANSI) Small Computer Systems Interface-2 (SCSI-2) ANSI/InterNational Committee for Information Technology Standards (INCITS) 131-1994 Specification.

If host controller 170 is to exchange data and/or commands with a memory device in accordance with an FC protocol, the FC protocol may comply and/or be compatible with the protocol described in ANSI Standard Information Technology—Fibre Channel (FC) Physical and Signaling Interface-3 ANSI/INCITS 303-1998 (R2003) Specification.

If host controller 170 is to exchange data and/or commands with a memory device in accordance with an SAS protocol, the SAS protocol may comply and/or be compatible with the protocol described in ANSI Standard "Information Technology—Serial Attached SCSI (SAS-2), ANSI/INCITS 457-2010 Specification.

If host controller 170 is to exchange data and/or commands with a memory device in accordance with a SATA protocol, the SATA protocol may comply and/or be compatible with the protocol previously described.

If host controller 170 is to exchange data and/or commands with a memory device in accordance with a Universal Serial Bus (USB) Attached SCSI (UAS) protocol, the UAS protocol may comply and/or be compatible with the protocol described in Information Technology—USB Attached SCSI (UAS) T10 Working document T10/2095-D Revision 4 Mar. 9, 2010.

If host controller 170 is to exchange data and/or commands with a memory device in accordance with an iSCSI protocol, the iSCSI protocol may comply and/or be compatible with the protocol described in "Internet Small Computer Systems Interface (iSCSI)" Network Working Group, Request for Comments: 3720, RFC—Proposed Standard (IETF Stream) published April 2004 by the Internet Engineering Task Force, Internet Engineering Task Force Secretariat c/o Corporation for National Research Initiatives, 1895 Preston White Drive, Suite 100, Reston, Va. 20191, United States of America.

Of course, alternatively or additionally, host controller 170 may exchange data and/or commands with a memory device via one or more other and/or additional protocols without departing from this embodiment.

Platform Controller Hub (PCH) 150 may include modules or logic to manage the interconnections between the above described components of host system 100 and various peripheral devices. In this embodiment, SATA device 160 is shown to be coupled to processor 110 and main memory 120 via host controller interface (i.e., SATA interface) 180. PCIe devices 130 and 140 are shown to be coupled to PCIe bridge 195, which is coupled to root port 190. It is understood that PCIe bridge acts as a "switch" for PCIe devices 130 and 140, while root port 190 acts as an interconnect to processor 110 and main memory 120.

Embodiments of the invention may associate any combination of peripheral devices 130, 140 and 160 to a common device identifier used by the host OS. It is to be understood that such an association allows for the "merging" of two or more devices. For example, SATA device 160 may be a Hard-Disk Drive (HDD) device, and PCIe device 130 may be a Solid State Disk (also "Solid State Drive") (SSD) device. Embodiments of the invention may allow both devices to be "merged," wherein SSD device 130 is to act as a "cache" for HDD device 160. It is to be understood that such a configuration would take advantage of the faster device operating speed of SSD device 130 and the faster connection of a PCIe link, while allowing for a larger amount of economical storage with HDD device 160.

Embodiments of the invention may include a cycle router to identify an I/O transaction including the common device identifier described above, and may process the I/O transaction to the first device, the second device, or configuration logic of the cycle router. In some embodiments, as described below, root port 190 is configured to function as the above described cycle router.

An SDD device includes a non-volatile storage medium, a memory controller to control reading, writing and erasing of the non-volatile storage medium, and a bus interface controller to control sending/receiving data from/to the device. An SSD device uses solid state memories as non-volatile storage medium. It is understood that solid state memories are comparatively more rugged than hard drives and offer the advantage of being much less sensitive to vibration, dust, humidity, and sudden changes in velocity. Solid state memories also tend to require less power than a typical hard drive with similar storage capacity. Examples of solid state memories include NAND flash memories, NOR flash memories, Phase Change Memories (PCM), PCM comprised of arrays of phase change memory cells and switches (PCMS), and silicon nanowire-based non-volatile memory cells.

Figure 2:
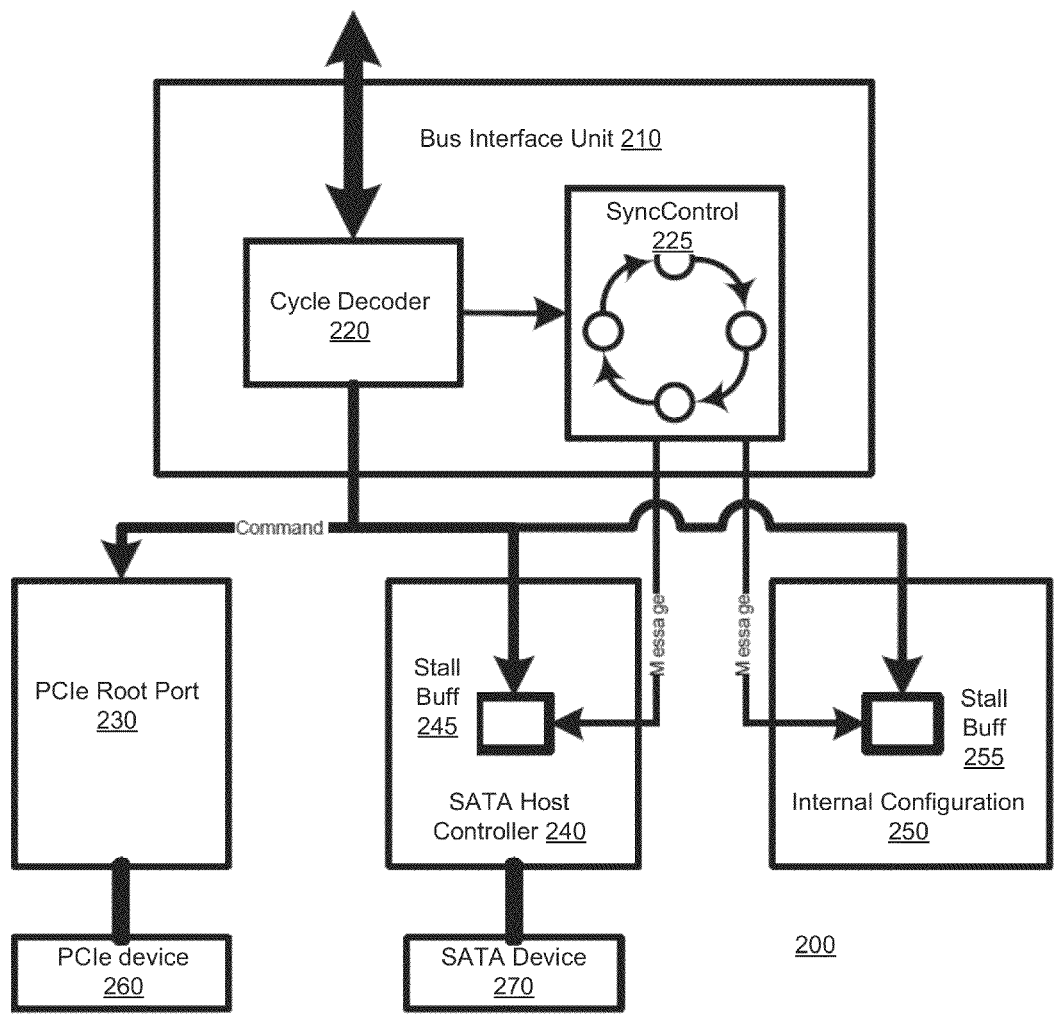
FIG. 2 is a block diagram of an embodiment of the invention.

As described above, SSD devices may be supported on a PCIe interface; furthermore, as described above, an SSD device connected to a host system via a PCIe interface may be merged with another device. FIG. 2 is a block diagram of an embodiment of the invention. In this example embodiment, system 200 illustrates a single driver model that allows PCIe SSD device 260 and an integrated host controller utilizing an Advanced Host Controller Interface (AHCI), such as SATA Host controller 240, to be viewed as a single device to the host OS. Thus, it is to be understood that a host OS device driver will view PCIe device 260 and SATA device 270 as the same device, even though they are physically two separate devices on different interfaces.

It is to be understood that while devices 260 and 270 are physically separate, they may contain shared resources (e.g. configuration registers, memory space, etc.). Thus, some form of synchronization is required. Furthermore, it is to be understood that connecting SSD device 260 over a PCIe link requires that some of those shared resources be "shadowed" to enable cycle decoding. As described below, system 200 provides a flexible yet controllable synchronization mechanism to "glue" devices 260 and 270 together so that they are viewed as a single device to host system software. It also provides a mechanism to manage erroneous cycles without potentially hanging the system.

System 200 includes bus interface unit 210 that further includes I/O cycle decoder 220 and synchronization control unit 225. In one embodiment, synchronization control unit 225 executes a finite state machine (described below and in FIG. 3) to synchronize I/O transactions for a plurality of devices.

System 200 further includes PCIe root port 230 to rout transactions to the appropriate PCIe port populated with SSD device 260. SATA host controller 240 receives commands for SATA device 270. As described above, in this embodiment SATA host controller 240 utilizes an AHCI (for example, an interface consistent with The Serial ATA AHCI 1.3 specification published Jun. 26, 2006, available for download at http://developer.intel.com; the specification includes a description of the hardware/software interface between system software and the host controller hardware). SATA host controller 240 further includes temporary storage buffer 245 (alternatively referred to herein as a "stall buffer"). Internal configuration 250 is the internal configuration of the SSD cycle router of system 200, and further includes stall buffer 255. While shown separately in FIG. 2, in some embodiments PCIe root port 230 may be configured to be the system SSD cycle router as described below.

Figure 3:
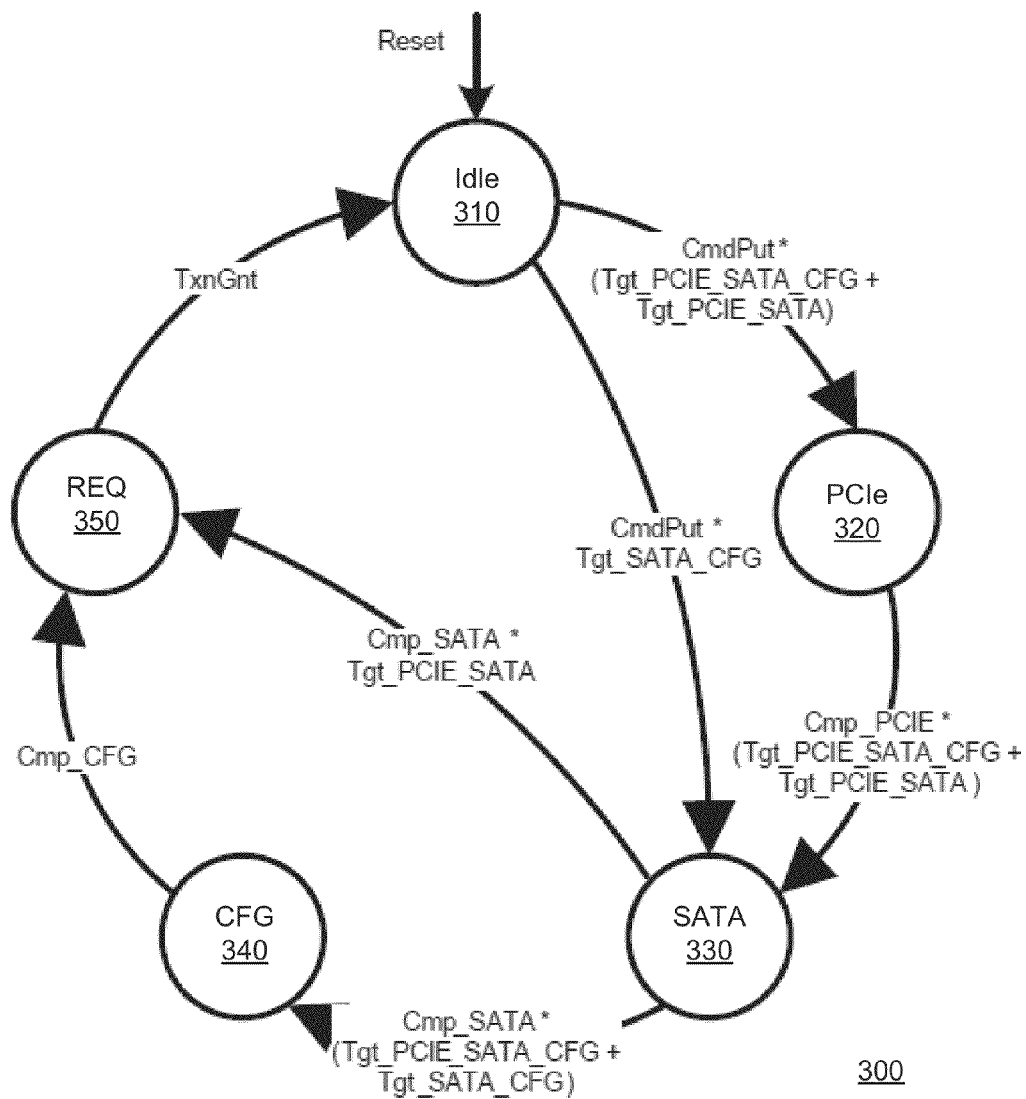
FIG. 3 is a flow diagram of a process to synchronize I/O transactions for a plurality of devices according to an embodiment of the invention.

As mentioned above, in one embodiment synchronization control unit 225 executes a finite state machine to synchronize I/O transaction for a plurality of devices. FIG. 3 is a flow diagram of a process to synchronize I/O transactions for a plurality of devices according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 300 describes sequencing operations responsible for sequencing cycles to each destination—e.g., at least one of PCIe device 260, SATA device 270 or cycle router configuration logic 250 of FIG. 2. Upon receiving a cycle that requires synchronization, process 300 may cycle through the following stages described below, with some stages targeting a destination:

Idle 310—no cycle targeting any of the shared resources;
PCIe 320—a cycle being forwarded to the PCIe device;
SATA 330—a cycle being forwarded to the SATA device;
CFG 340—a cycle being forwarded to the internal configuration register block for "shadowing;" and
REQ 350—wherein cycle processing completion is pending to be returned for cycles targeting shared resources.

For a cycle that targets all destinations, it may initially be pushed to all destinations when the synchronization control unit transitions from IDLE stage 310 to PCIe stage 320. Along with the forwarded command put (CmdPut) to all the destinations, a message put (MsgPut) may also be signaled to both SATA and SSD cycle router configuration stall buffers (e.g., stall buffers 245 and 255 of FIG. 2) with a "Stall Dispatch" message. This will cause both stall buffers to store the cycle locally, but not yet release it to its respective destination.

Upon receiving the successful completion from PCIe stage 320, the synchronization control unit may transition to SATA stage 330, thereby causing a "Release Dispatch" message to be sent to the SATA controller. This will cause the SATA stall buffer to release the stored cycle to the SATA device. If an unsuccessful completion was received from PCIe stage 320 (erroneous cycle), a "Drop" message may be sent to the SATA controller, and the SATA stall buffer contents will be deleted.

Upon receiving the successful completion from SATA stage 330, the synchronization control unit may transition to CFG stage 340, causing the "Release Dispatch" message to be sent to the SSD cycle router configuration stall buffer. If an unsuccessful completion was received from SATA stage 330 (e.g., an erroneous cycle or dummy completion received from the SATA device), a "Drop" message may be sent to the SSD cycle router configuration stall buffer, and the SATA stall buffer contents will be deleted.

Once all completions are received, the synchronization control unit may transition into REQ stage 350 to arbitrate with the host backbone bus for a slot to return the completion to the cycle initiator with the merged completion results.

It is to be understood that similar processes may be executed for cycles targeting different sets of destinations—PCIe and SATA devices only, SATA and CFG only, etc. Because PCIe is a robust serial protocol and has the capability to expand links into multiple lanes (e.g., x2, x4, x8, etc), it is to be understood that it is an ideal protocol for devices which require high and reliable bandwidth communications. It is further understood that PCIe root ports may be configured to serve as the above described cycle router. Configuring a PCIe root port in such a manner reduces the amount of additional logic a host system must include to utilize embodiments of the invention.

Figure 4:
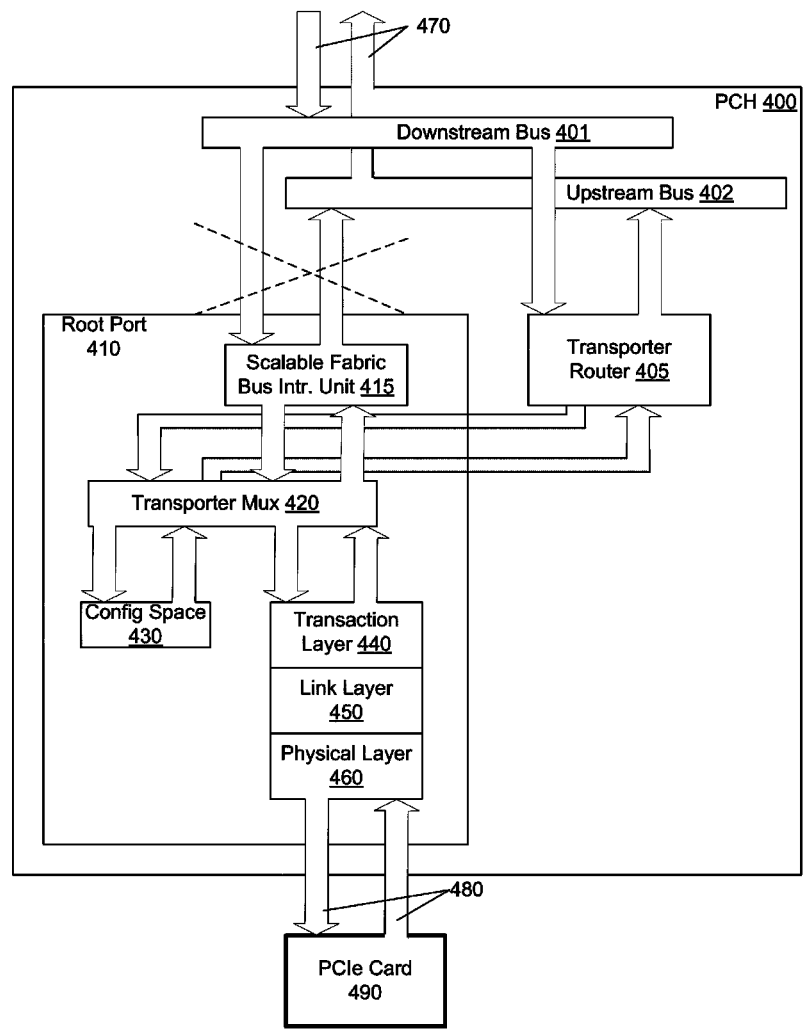
FIG. 4 is a diagram of a PCIe root port configured according to an embodiment of the invention.

FIG. 4 is a diagram of a PCIe root port configured according to an embodiment of the invention. In this embodiment, PCH 400 provides a host system access to peripheral devices via Direct Media Interface (DMI) 470. PCIe root port 410 includes physical layer 460, data link layer 450, transaction layer 440 and configuration space 430. It is understood that said configuration space in PCIe root port 410 is, by default, visible to host system software. Embodiments of the invention may configure PCIe root port 410 into a packet transport for an AHCI device. In FIG. 4, the actual AHCI storage device (not shown) is outside of host PCH 400 and is connected to the host system via PCIe card 490. Thus, in this embodiment, an AHCI device such as an SSD device may connect to a host platform through a PCIe serial link instead of a conventional SATA serial link, but will appear to system software as if it is sitting in the host root complex as described below.

In this embodiment, prior to host system software or OS enumeration, host platform BIOS or boot straps may configure PCIe root port 410 to hide PCIe configuration space 430 from host system software, thereby preventing software from discovering a PCIe root port capability in the PCI Bus Hierarchy. The capability of PCIe root port 410 to transmit and receive transactions from Backbone Buses 401 and 402 would further be disabled (this capability will be replaced by the Transporter Router 405 as described below). Furthermore, in this embodiment the capability of PCIe root port 410 to interface with other devices in the host platform (e.g., an Interrupt Controller, a Power Management Controller, etc.) is further disabled (this capability will be replaced by Transporter Mux 420).

In this embodiment, Transporter Router 405 has a dedicated Bus Device Function (BDF) in the host Root Complex and appears as an AHCI Controller on the PCI Bus Hierarchy. Upon disabling the capability of Bus Interface Unit (BIU) 415 to transmit and receive transactions from Backbone Buses 401 and 402, host platform configuration commands to PCIe Configuration Space 430 are performed through Transporter Router 405, which appears to host system software as an AHCI controller (i.e., an AHCI HBA that allows host system software to communicate with SATA devices). It is to be understood that because all transactions are routed via Transporter Router 405, (appearing as a AHCI Controller), only the Transporter Router requires logic to determine whether a transaction should be routed to PCIe Configuration Space 430 (which is hidden from host system software) or routed to the SSD device coupled to the system via PCIe card 490. In this embodiment, all command attribute alterations (e.g., modifying Tags, Requester ID, Completer ID, etc.) are performed inside Transporter Router 405, which makes it appear to host system software as the actual AHCI Controller.

Root Port 410 further includes Transporter Mux 420 to enable various infrastructure capabilities. For example, Transporter Mux 420 may provide access to (hidden) PCIe Root Port Configuration Space 430. Transporter Mux 420 may divert packets from PCI Express Link 480 to Transporter Router 405, and divert packets from Transporter Router 405 to PCI Express Link 480. In this embodiment, Transporter Mux 420 further controls all the sideband interfaces from root port 410 to other devices in the platform such as a Power Management Controller and an Interrupt Controller (not shown) or vice versa.

Figure 5A:
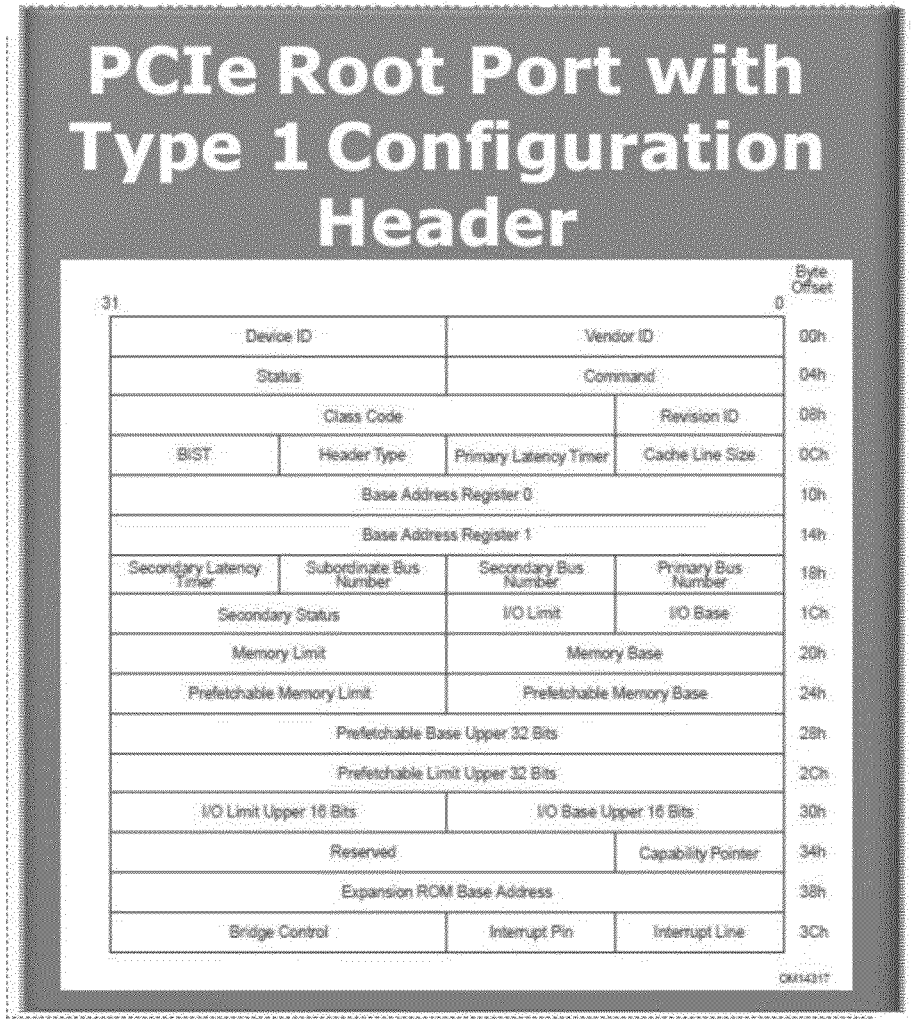
FIG. 5A and FIG. 5B illustrate packet formats utilized by an embodiment of the invention.
Figure 5B:
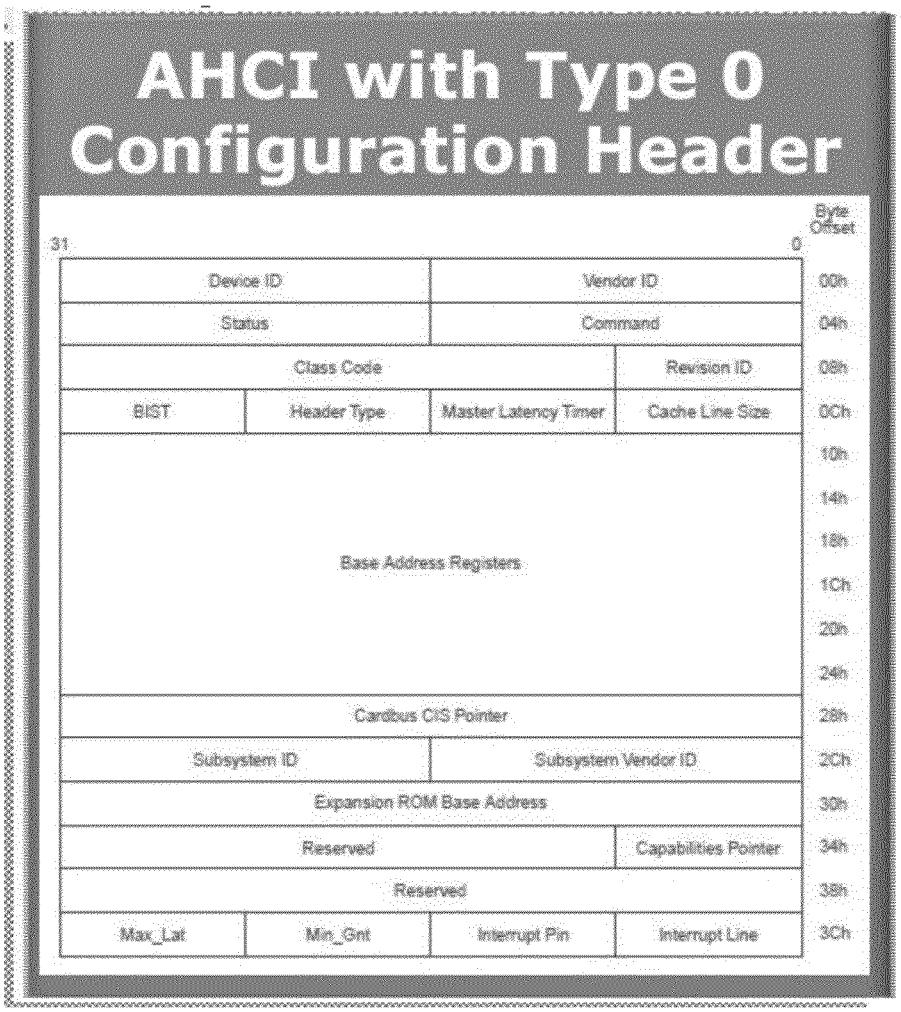

FIG. 5A and FIG. 5B illustrate packet formats utilized by an embodiment of the invention. Transporter Router 405 may receive packets directed towards the SSD device (coupled to the host system via PCIe card 490) from Downstream PCH Backbone Bus 401 in format 550 shown in FIG. 5B; Transporter Router 405 will convert said packets to format 500 shown in FIG. 5A to be processed by PCIe transaction layer 440. Transporter Router 405 may also receive packets from the SSD device via PCIe transaction layer 440 in format 500 and convert said packets to format 550 to be sent to host system software via Upstream PCH Backbone Bus 402, such that it appears to the host system that the packet was received from an AHCI.

Referring back to the example embodiment of FIG. 4, Transporter Mux 420 logically resides above PCI Express Transaction Layer 440, thus allowing it to control all the main buses between said Transaction Layer and the Backbone Bus (i.e., Downstream PCH Backbone Bus 401 and Upstream PCH Backbone Bus 402).

As described above, embodiments of the invention allow for storage devices such as SSD devices to take advantage of the high bandwidth provided by the PCIe multi-lane capability; however, it is understood that in the prior art, a plurality of SATA SSD devices connected to a host system via a plurality of PCIe root-ports are standalone devices as each of them has an individual AHCI controller that appears to system software as independent device.

Furthermore, the PCH chipset has integrated an AHCI/SATA controller where SATA SSD drives and lower performance optical drives (ODD) and hard disk drives (HDD) are typically connected. This limits the use of memory systems such as RAID from utilizing the above described PCIe SSD storage devices, or using the high bandwidth PCIe link for caching of HDD content in a single driver configuration.

Figure 6:
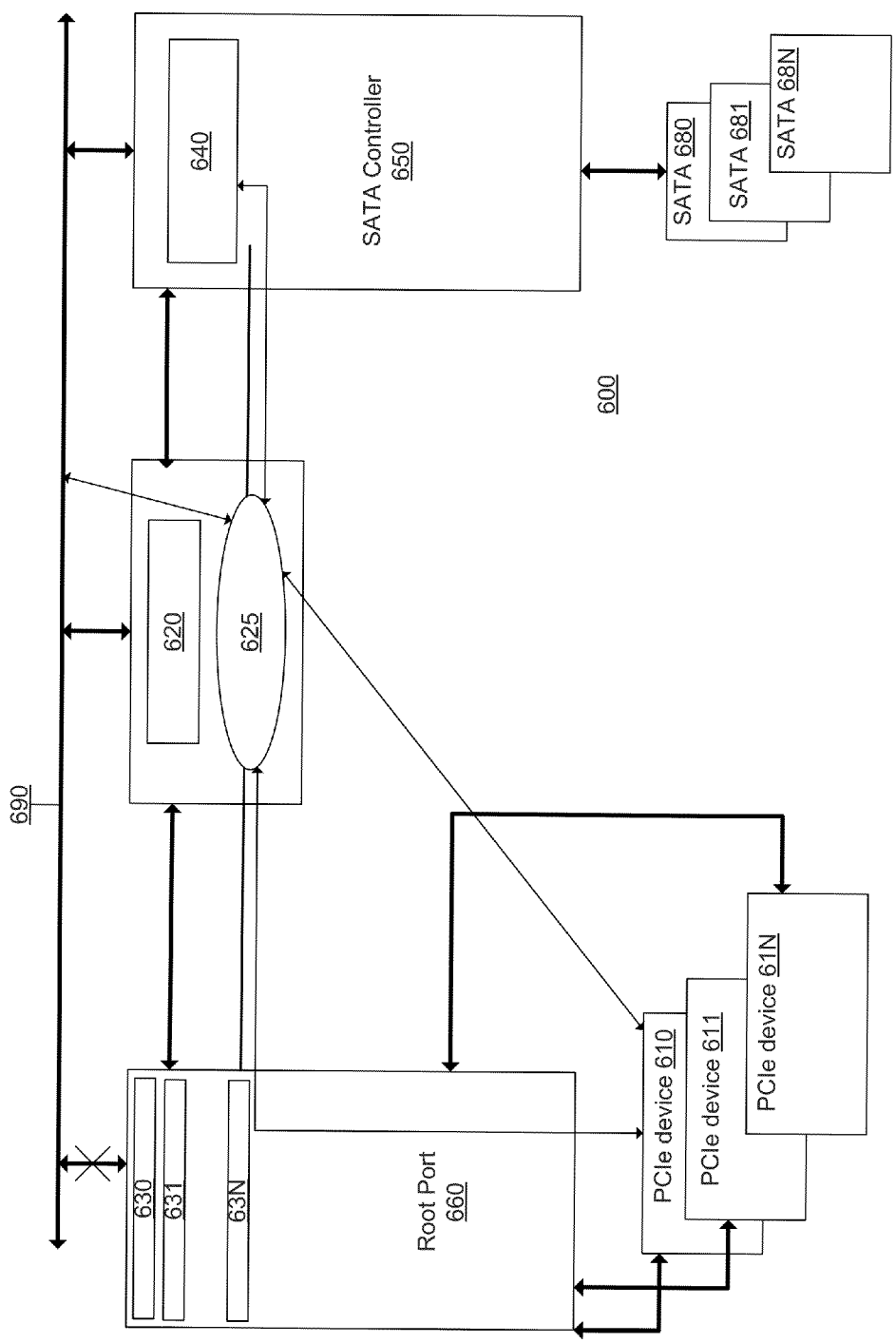
FIG. 6 is a diagram of an embodiment of the invention to "aggregate" a plurality of devices coupled to a host system via a plurality of PCIe interfaces.

It is to be understood that embodiments of the invention described above address these issues by enabling "aggregation" of these PCIe SSD devices such that they appear to host system software as under a single storage controller, although physically they are individual devices on separate independent PCIe interfaces. FIG. 6 is a diagram of an embodiment of the invention to "aggregate" a plurality of devices coupled to a host system via a plurality of PCIe interfaces. This example embodiment enables host system software to see and access a plurality of PCIe SSD devices as if they were connected under a single integrated AHCI/SATA controller (i.e., similar to a RAID system).

It is understood that prior art SSDs are SATA-based devices connected to a single integrated AHCI/SATA controller. As such, it is understood that RAID and cache use models are naturally supported in the single driver configuration; however, as described above, embodiments of the invention may enable the "aggregation" of SSD devices that are each connected via a PCIe link such that host system software appears to access said devices under a single integrated AHCI/SATA controller. Thus, embodiments of the invention enable using the high bandwidth PCIe SSD device for caching of SATA HDD content in a single driver configuration, or the support of use models such as RAID among PCIe SSD devices (or a mix of PCIe SSD devices and SATA devices, as described below and shown in FIG. 6).

It is understood that RAID solutions combine a plurality of physical disk drives (for example, any of PCIe SSD devices 610-61N and SATA devices 680-68N) into a logical drive for purposes of reliability, capacity, or performance. Thus, instead of multiple physical disk drives, the host system OS system sees a single logical drive. As is well known to those skilled in the art, there are many standard methods referred to as RAID levels for distributing data across the physical disk drives in a RAID system.

For example, in a level 0 RAID system the data is striped across a physical array of disk drives by breaking the data into blocks and writing each block to a separate disk drive. Input/Output (I/O) performance is improved by spreading the load across many disk drives. Although a level 0 RAID improves I/O performance, it does not provide redundancy because if one disk drive fails, data is lost.

A level 5 RAID system provides a high level of redundancy by striping both data and parity information across at least three disk drives. Data striping is combined with parity to provide a recovery path in case of failure. A level 6 RAID system provides an even higher level of redundancy than a level 5 RAID system by enabling recovery from double disk failures.

In a level 6 RAID system, two syndromes referred to as the P syndrome and the Q syndrome are generated for the data and stored on disk drives in the RAID system. The P syndrome is generated by simply computing parity information for the data (data blocks (strips)) in a stripe (data blocks (strips), P syndrome block and Q syndrome block). The generation of the Q syndrome requires Galois Field (GF) multiplications and is a more complex computation. The regeneration scheme to recover data and/or P syndrome block and/or Q syndrome block performed during disk recovery operations requires both GF and inverse operations.

The hardware remapping architecture described below and shown in FIG. 6 handles the register content synchronization among these devices, upstream and downstream cycle routing and remapping, and emulates the necessary behavior transparent to the devices and the host system software.

In the illustrated embodiment of FIG. 6, after a reset of system 600, PCIe SSD devices 610, 611, . . . 61N are discovered behind PCIe root-port 660. BIOS 620 discovers their integrated AHCI/SATA controllers, shown as controller 650 (as described above, it is understood that AHCI/SATA device controllers already have aggregation functionality, and thus a single controller is shown as their representation). BIOS 620 further configures PCIe root-port registers 630, 631, . . . , 63N appropriately such that it is "transparent" to the host system software—i.e. enabled for receiving forwarded downstream and upstream cycles from backbone bus 690, but hidden to software by disabling the PCIe root-port BIU.

BIOS 620 may then provide additional information to PCIe root-port registers 630-63N and AHCI registers 640 (e.g., information indicating whether specific PCI capability structures are supported on the PCIe SSD devices 610-61N) to assist in cycle routing/remapping before it initiates the device re-enumeration in the normal boot sequence. Thus, embodiments of the invention may enable the support of any AHCI-compliant PCIe SSD devices in host system 600.

Configuration registers 640 of integrated AHCI/SATA controller 650 are visible to the software of system 600, (similar to any other discovered devices); however, it is understood that PCIe SSD devices 610-61N enabled for "aggregation," including configuration registers 630-63N, are not visible to the software system 600 as they are behind hidden PCIe root-port 660. In this embodiment, remapping logic 625 handles the configuration register content synchronization, where for every configuration register write to integrated AHCI controller 650, hardware internally generates the corresponding configuration register write to each of aggregated PCIe configuration registers 630-63N.

Thus, in this embodiment, PCIe SSD devices 610-61N are being configured in the similar way as integrated controller AHCI 650, but transparent to both the PCIe SSD devices and the host software of system 600. Configuration reads will either return the register value from the respective integrated controller, or will return a merged value based on both the register value from integrated controller 650 and the respective PCIe SSD device (e.g., dependent on the register offset). In one embodiment, hardware remapping logic 625 further ensures PCIe cycle ordering rules are maintained by making sure all involved devices have completed the configuration cycle before returning the completion to the CPU of system 600 (not shown).

In this embodiment, as part of the configuration register content synchronization described above, hardware remapping logic 625 further handles the Memory I/O resource sub-allocation to each of aggregated PCIe SSD devices 610-61N and SATA devices 680, 681, . . . , 68N. In this embodiment, integrated AHCI/SATA controller 650 is allocated the full AHCI memory space with unused range corresponding to the unimplemented ports. Hardware remapping logic 625 may internally reallocate part of the unused memory resource to each of aggregated PCIe SSD devices 610-61N. This may be done, for example, by hardware modifying the value written to the corresponding PCI Base Address register (BAR) of PCIe SSD devices 610-61N during said configuration register content synchronization.

In this embodiment, hardware remapping logic 625 further handles all the bus master direct memory access (DMA) cycles from aggregated PCIe SSD devices 610-61N such that they are initiated using the same device identifier/Requester ID (i.e. Bus: Device: Function) as integrated AHCI/SATA controller 650 and SATA devices 680-68N (these bus master cycles may also be required to share a Tag value for the single Requester ID). Hardware remapping logic 625 may also internally allocate a range of Tag values to integrated AHCI/SATA controller 650 and each of aggregated PCIe SSD devices 610-61N such that there is no conflict. Hardware remapping logic 625 may implement a queue to track the original Tag value of the upstream PCIe non-posted cycle and the corresponding remapped Tag value. The remapped Tag value is then de-allocated after all completions for the non-posted cycle have been returned. When all the allocated Tag values have been used, hardware remapping logic 625 may further internally throttle the non-posted cycles from the corresponding PCIe SSD device until a free Tag is available. Hardware remapping logic 625 may further use the same sideway queue to map the completions back to the original Tag before forwarding down to PCIe SSD devices 610-61N.

Embodiments of the invention may further support interrupt routing and delivery via a Message Signaled Interrupt (MSI), or a legacy interrupt. For MSI, the interrupt delivery is handled naturally as MSI structures for each of aggregated PCIe SSD devices 610-61N will be configured appropriately by hardware remapping logic 625 as part of the configuration register content synchronization mechanism described above. For the legacy Assert_INTx/Deassert_INTx interrupts over the PCIe interface, hardware remapping logic 625 internally re-routes the interrupt to the same interrupt channel as configured for integrated AHCI/SATA controller 650, thus ensuring said interrupts are transparent to the devices and the host software of system 600.

FIG. 7 is block diagram of a system that may utilize an embodiment of the invention. System 700 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 700 may include processor 710 to exchange data, via system bus 720, with user interface 760, system memory 730, peripheral device controller 740 and network connector 750. Peripheral device controller 740 may comprise any of the embodiments of the invention described above, capable of "merging" a peripheral device coupled to system 700 via a PCIe link with another peripheral device coupled to system 700 (e.g., via another PCIe link or a SATA link).

System 700 may further include antenna and RF circuitry 770 to send and receive signals to be processed by the various elements of system 700. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 700 may include multiple physical antennas.

While shown to be separate from network connector 750, it is to be understood that in other embodiments, antenna and RF circuitry 770 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   a first Peripheral Component Interconnect express (PCIe) device;
   a second device;
   a host processor to execute an operating system (OS) and communicatively coupled simultaneously to both the first PCIe device and the second device, wherein the first and second devices are merged by associating both devices with a single common device identifier to be used by the OS such that the first PCIe device and the second device are viewed as a single device by the OS;
   a cycle router to identify an input/output (I/O) transaction including the common device identifier, and to process the I/O transaction to at least one of the first device, the second device, or configuration logic of the cycle router;
   an antenna; and
   radio frequency circuitry coupled to the antenna to receive signal data to be processed by the system.

2. The system of claim 1, wherein the second device comprises another PCIe device.

3. The system of claim 1, wherein the second device comprises a Serial Advanced Technology Attachment (SATA) device.

4. The system of claim 1, wherein the second device comprises a memory device, the second device to store data to be requested by the first PCIe device.

5. The system of claim 3, wherein the cycle router comprises a PCIe root port of the system.

6. The system of claim 5, wherein the common device identifier to be used by the OS is to identify the first and second device as a SATA device.

7. The system of claim 6, wherein the access to the PCIe root port by the OS is to be disabled, the system further comprising:
a host controller interface (HCI) operatively coupling the SATA device to the host processor, the OS to access the first and second devices via the HCI.

8. The system of claim 6, wherein the first and second devices comprise a redundant array of independent disks (RAID) subsystem, and the I/O transaction including the common device identifier is to be processed to the first and second devices.

9. The system of claim 6, further comprising:
an interrupt router to route a system interrupt directed to the common device identifier to the first PCIe device.

10. An apparatus comprising:
a processing core to execute an operating system (OS);
a first Peripheral Component Interconnect express (PCIe) device interface;
a second device interface, wherein the first PCIe device and the second device are both simultaneously communicatively coupled to the processing core;
logic to merge the first and second device interfaces with a common device identifier to be used by the OS such that the first PCIe device and the second device are viewed as a single device by the OS; and
a cycle router to identify an input/output (I/O) transaction including the common device identifier, and to process the I/O transaction to at least one of the first device interface, the second device interface, or configuration logic of the cycle router.

11. The apparatus of claim 10, wherein the second device interface comprises another PCIe device interface.

12. The apparatus of claim 10, wherein the second device interface comprises a Serial Advanced Technology Attachment (SATA) device interface.

13. The apparatus of claim 10, wherein the cycle router comprises a PCIe root port.

14. The apparatus of claim 13, wherein the common device identifier to be used by the OS is to identify the first and second device interface as a SATA device interface.

15. The apparatus of claim 14, wherein the access to the PCIe root port by the OS is to be disabled, the apparatus further comprising:
a host controller interface (HCI) operatively coupling the SATA device interface to the host processor, the OS to access the first and second device interfaces via the HCI.

16. The apparatus of claim 14, further comprising:
an interrupt router to route a system interrupt directed to the common device identifier to the first PCIe device interface.

17. A method comprising:
merging a first Peripheral Component Interconnect express (PCIe) device and a second device with a common device identifier to be used by a host operating system (OS), wherein the first PCIe device and the second device are both simultaneously coupled to a processing core executing the OS such that the first PCIe device and the second device are viewed as a single device by the OS;
identifying an input/output (I/O) transaction including the common device identifier via a cycle router; and
processing the I/O transaction to at least one of the first device, the second device, and configuration logic of the cycle router.

18. The method of claim 17, wherein the second device comprises another PCIe device.

19. The method of claim 17, wherein the second device comprises a Serial Advanced Technology Attachment (SATA) device.

20. The method of claim 17, wherein the second device comprises a memory device, the second device to store data to be requested by the first PCIe device.

21. The method of claim 19, wherein the cycle router comprises a PCIe root port of the system.

22. The method of claim 21, wherein the common device identifier to be used by the OS is to identify the first and second device as a SATA device.

23. The method of claim 22, further comprising:
disabling access to the PCIe root port by the OS is to be disabled, the OS to access the first and second devices via a host controller interface (HCI).

24. The method of claim 22, wherein the first and second devices comprise a redundant array of independent disks (RAID) subsystem, and the I/O transaction including the common device identifier is to be processed to the first and second devices.

25. The method of claim 22, further comprising:
routing a system interrupt directed to the common device identifier to the first PCIe device.

\* \* \* \* \*